United States Patent [19]

Vos

[11] Patent Number: 4,849,927

[45] Date of Patent: Jul. 18, 1989

[54] METHOD OF CONTROLLING THE OPERATION OF SECURITY MODULES

[75] Inventor: Gerardus J. F. Vos, HG Maarssen, Netherlands

[73] Assignee: NCR Corporation, Dayton, Ohio

[21] Appl. No.: 99,867

[22] Filed: Sep. 22, 1987

[30] Foreign Application Priority Data

Jun. 12, 1987 [GB] United Kingdom ............... 8713734

[51] Int. Cl.⁴ .................. G06F 15/20; G06F 9/00; G06K 5/00

[52] U.S. Cl. ........................ 364/900; 364/927.91; 364/949; 364/918.7; 364/965; 235/382.5; 235/382; 235/431

[58] Field of Search ............ 235/379, 380, 382, 382.5, 235/430, 431; 364/900 MS File, 200 MS File; 380/23, 24

[56] References Cited

U.S. PATENT DOCUMENTS

| | | | |
|---|---|---|---|
| 3,996,449 | 12/1976 | Attanasio et al. | 235/431 |
| 4,423,287 | 12/1983 | Zeidler | 235/382 X |
| 4,528,644 | 7/1985 | Soderberg et al. | 364/900 |
| 4,558,176 | 12/1985 | Arnold et al. | 364/900 X |
| 4,593,384 | 6/1986 | Kleijne | 365/228 |

FOREIGN PATENT DOCUMENTS

| | | |
|---|---|---|
| 0169913 | 2/1986 | European Pat. Off. . |
| 0191162 | 8/1986 | European Pat. Off. . |
| 2122777 | 1/1984 | United Kingdom . |
| 2154344 | 9/1985 | United Kingdom . |
| 2163577 | 2/1986 | United Kingdom . |
| 2182467 | 5/1987 | United Kingdom . |
| 8503584 | 8/1985 | World Int. Prop. O. . |

*Primary Examiner*—Eddie P. Chan
*Assistant Examiner*—Paul Kulik
*Attorney, Agent, or Firm*—Wilbert Hawk, Jr.; Albert L. Sessler, Jr.; Richard W. Lavin

[57] ABSTRACT

In a method of controlling the operation of a security module, wherein firmware controlling the operation of the security module (10) is stored in a program memory (40), new firmware may be loaded into the module (10). An authentication key (KA) is encrypted using a key storage key (KSK) stored in a resettable shift register (54) in the security module and the encrypted authentication key is stored in a secure memory (36). A firmware authentication value FAV is calculated, using the authentication key (KA), externally of the security module (10), for the new firmware, and the new firmware, together with FAV is loaded into a data memory (38) in the security module (10). A processor (30) in the security module (10) recalculates the firmware authentication value using the stored authentication key (KA) and compares the recalculated value with the loaded value FAV. If a correct comparison is achieved, the new firmware is transferred into the program memory (40). Otherwise, a reject status signal is issued and the firmware in the data memory (38) is erased.

2 Claims, 6 Drawing Sheets

| FIRMWARE F | FAV |
|---|---|

BYTES 1 2 — — — — — — — — — — — n   n+1 — — n+4

METHOD OF CONTROLLING THE OPERATION OF SECURITY MODULES

BACKGROUND OF THE INVENTION

1. Field of Invention

This invention relates to a security module and more particularly to a method of controlling the operation of security modules.

Essentially, a security module, which is sometimes referred to as a tamper-resistant module, includes a physically secure housing containing processing means and storage means for storing sensitive data. An attempt to tamper with the security module, for example, by attempting to break open or drill through the housing results in the resetting of the storage means which stores the sensitive data.

Security modules have found application in data processing systems and networks where a high degree of security is important. Such applications include electronic payment systems, electronic funds transfer (EFT) systems, data encryption and decryption, PIN (personal identification number) verification, access control and home banking.

2. Description of the Prior Art

U.S. Pat. No. 4,593,384 discloses a security module which includes a ceramic housing formed of six parts connected together and which contains a processor and a resettable shift register for storing sensitive data. Each part of the housing is provided with a pair of conductive path portions disposed in superposed layers and having complementary zig-zag configurations. The conductive path portions on the housing parts are interconnected to form first and second conductive paths. Interruption of either conductive path, or a short circuit between the two paths, resulting from an attempt to break into the housing, causes a reset signal generator to provide a reset signal to erase the contents of the resettable shift register. A temperature sensor circuit responsive to the temperature in the housing falling below a predetermined level also causes the reset signal generator to provide a reset signal to reset the resettable shift register. The known security module contains a programmable read-only memory (PROM) which stores the firmware for the security module, that is, the software program to be executed by the processor.

U.S. patent application, Ser. No. 877,049, filed June 23, 1986, now U.S. Pat. No. 4,691,350, discloses a security module in which each part of a ceramic housing includes two layers of wire mesh are which electrically connected to make one circuit together with a conductive sheet placed between the layers producing a reset signal if the circuit is interrupted or shorted to the conductive sheet.

U.S patent application, Ser. No. 877,907, filed June 24, 1986, now U.S. Pat. No. 4,811,288, discloses a security module in which each part of a ceramic housing includes two layers of wire mesh formed by a conductive thin film applied to the inner surface of each part.

U.S. patent application, Ser. No. 058,730, filed June 5, 1987, now U. S. Pat No. 4,807,284, discloses a security module in which each part of a ceramic housing has applied to its inner surface by thick film deposition techniques a conductive path segment.

The known security modules have the disadvantage of lacking operational flexibility. Thus, since the functionality of the known security modules is determined by the firmware stored in the PROM and since the PROMs generally are programmed by special PROM programmer devices in an irreversible manner, once the known security modules have been assembled and closed with the PROM enclosed therein, changes to the functionality of the known security modules are no longer possible. Such changes are desirable if the system in which the security module is being used is required to be upgraded or enhanced.

It is thus an object of the present invention to provide a method of controlling the operation of a security module, which ennables such modules to have a high degree of operational flexibility.

SUMMARY OF THE INVENTION

This and the other objects of the invention are fulfilled by providing a method of controlling the operation of a security module which includes processing means, a program memory adapted to store controlling firmware for controlling the operation of said security module, input/output means, and a tamperresistant housing adapted to cause the generation of a tamper-indicating signal in response to an attempt to tamper with said housing, including the steps of: entering an authentication key into said security module via said input/output means after the tamper-resistant housing has been sealed; encrypting the entered authentication key storing the encrypted authentication key securely in first storage means in said security module, whereby the stored encrypted authentication key becomes unavailable in response to the generation of said tamper-indicating signal; computing externally of said security module a first firmware authentication value utilizing the controlling firmware to be loaded into the security module and said authentication key; adding the first firmware authentication value to the firmware to be loaded entering, via said input/output means, said controlling firmware and said first firmware authentication value into a location in a second storage means in said security module; computing in said processing means a second firmware authentication value utilizing the controlling firmware stored in said second storage means and said authentication key stored in said first storage means; comparing said first and second firmware authentication values; transferring the controlling firmware stored in said second storage means into said program memory if there is a valid comparison; and erasing the controlling firmware stored in said second storage means if there is an invalid comparison.

It will be appreciated that a method according to the invention allows a security module to have its functionality changed in a trusted manner in a non-secure environment. Thus, if a system in which the security module is being used is upgraded or enhanced, the firmware controlling the operation of the security module can be altered in a trusted way in a non-secure environment at the location where the security module is installed and in use.

A further advantage of the method according to the invention is that a standard module can be manufactured and shipped to a customer location where desired firmware can be loaded with the security module in a non-secure environment. Thus, a relatively low-cost manufacturing procedure can be achieved.

Furthermore, it will be appreciated that the advantages of the invention are achieved without the use of expensive memory devices as EPROMs (erasable programmable read-only memories) or EAROMs (elecrically alterable read-only memories). It will be appreciated that EPROMs generally require erasure of stored information before new information can be entered therein, and that such erasure is generally effected using UV light. Thus, an EPROM device could not be reprogrammed once the device had been assembled inside a closed security module. Although EAROM devices are known, they are expensive and require special, large magnitude voltages to effect reprogramming, which voltages would be difficult to generate and/or control within a closed security module.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
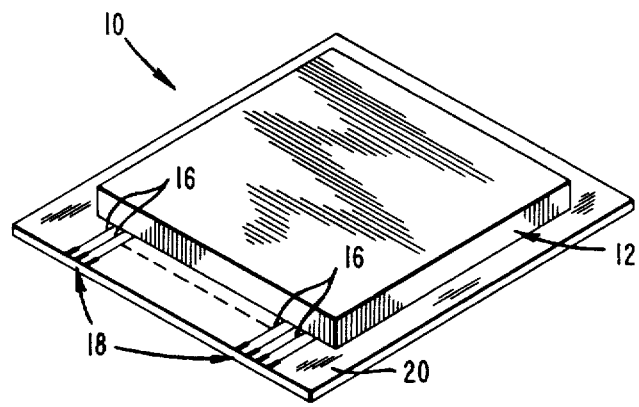
FIG. 1 is a perspective view of a security module.
Figure 2:
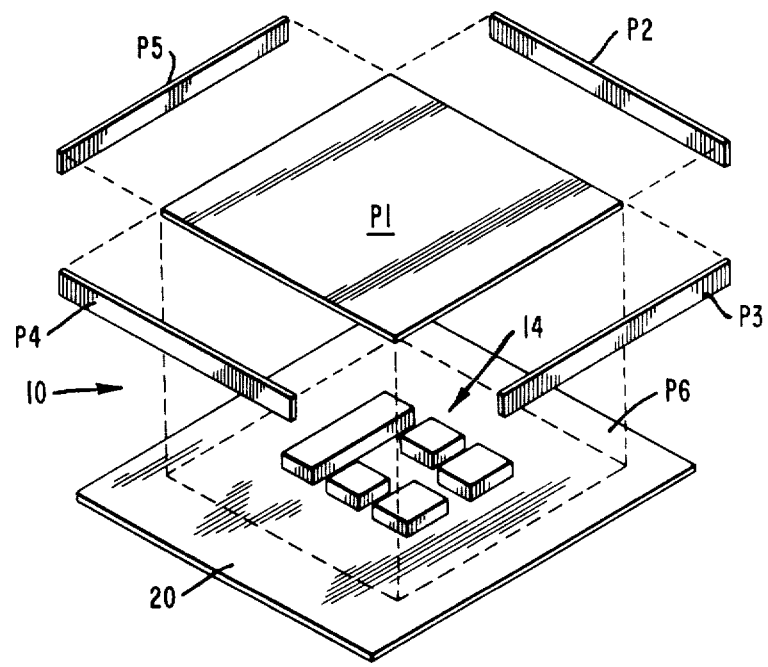
FIG. 2 is an exploded perspective view of the various part of the housing of the security module shown in FIG. 1.

Referring to FIGS. 1 and 2 of the drawings, there is shown a security module 10 which includes a housing 12 containing electronic circuitry 14, shown schematically in FIG. 2. The housing consists of a top plate P1, side plates P2-P5 and a base plate P6. The six plates P1-P6 are preferably formed of a ceramic material since ceramic material is highly resistant to chemical attack. The electronic circuitry 14 is mounted on the base plate P6 and is connected by conductive leads 16 (FIG. 1) to terminal areas 18 provided on an end portion 20 of the base plate P6. The terminal areas 18 are in contact with respective input/output pins (not shown) in a conventional manner to enable connections to external circuitry to be made by mounting the security module 10 on a printed circuit board (not shown), or by means of plug and socket type connections.

Each of the six plates has provided thereon a pair of conductive path segments (not shown), the conductive path segments on the respective plates P1-P6 being joined together to form two wire meshes. The wire meshes are connected to tamper detection circuitry for protecting the security module 10 against unauthorized tampering, as will be described in more detail hereinbelow. The precise configuration of the wire meshes is not of importance for the present invention. Examples of possible configurations are disclosed in the aforementioned U.S. Pat. No. 4,593,384, and in British Patent application No. 2 182 176. Moreover, if a lower degree of security is acceptable, a configuration of only one wire mesh could suffice.

Figure 3:
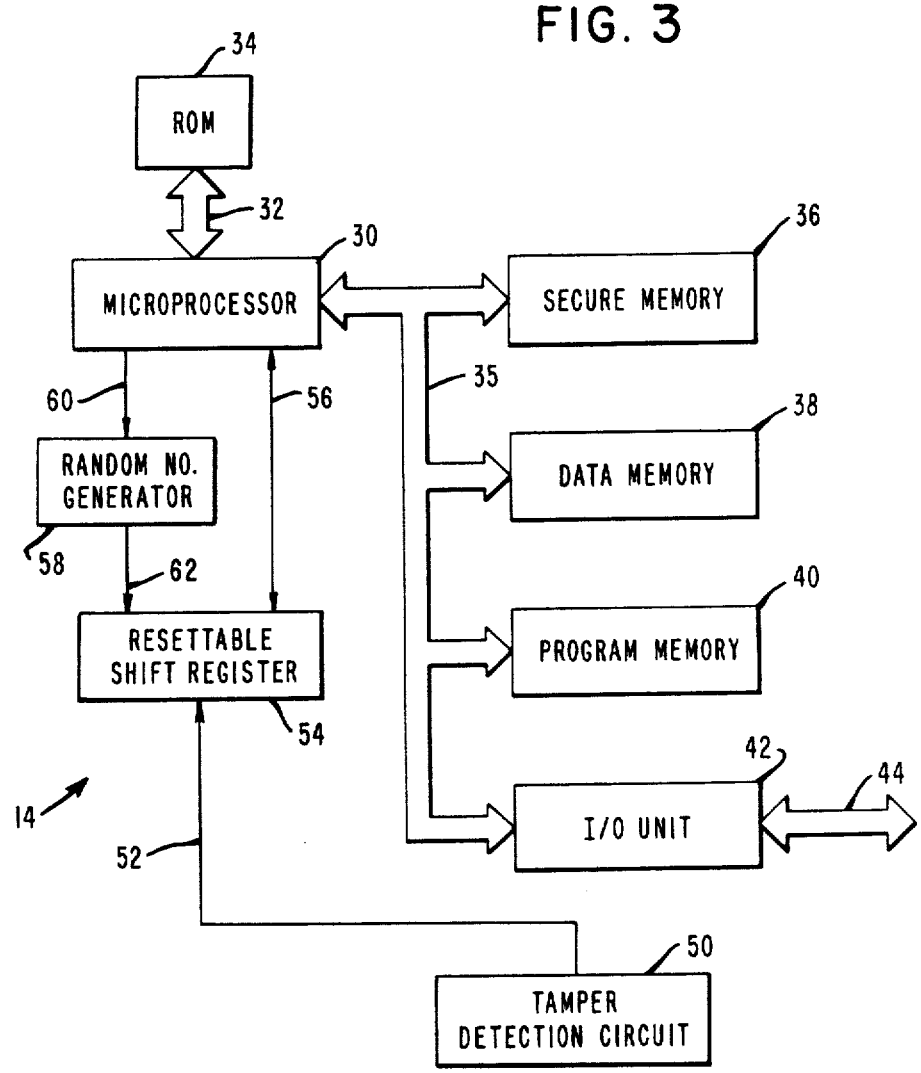
FIG. 3 is a schematic block diagram of the circuitry included within the security module shown in FIG. 1.

Referring now to FIG. 3, there is shown in block diagram form the circuitry 14 included within the housing 12 of the security module 10. The circuitry 14 includes a microprocessor 30 connected via a bus 32 to a ROM (read-only memory) 34. The microprocessor 30 is also connected via a bus 35 to a secure memory 36, a data memory 38, a program memory 40 and an I/O (input/output) unit 42 which is connected via a bus 44 to the terminal areas 18 (FIG. 1) of the security module 10.

The secure memory 36, data memory 38 and program memory 40 are implemented as RAM (random access memory) devices and may together be formed by one or more commercially available RAM devices, such that the secure memory 36, data memory 38 and program memory 40 form respective portions of a single address space. The secure memory 36 stores information which is rendered unavailable if the security module 10 is tampered with in an attempt to gain access to information stored therein. The data memory 38 and program memory 40 store data information and program information, respectively.

Further included in the circuitry 14 is a tamper detection circuit 50, connected over a lead 52 to a resettable shift register 54. The shift register 54 is connected to the microprocessor 30 over a lead 56. A random number generator 58 is connected to the microprocessor 30 over a lead 60 and to the shift register 54 over a lead 62.

Figure 4:
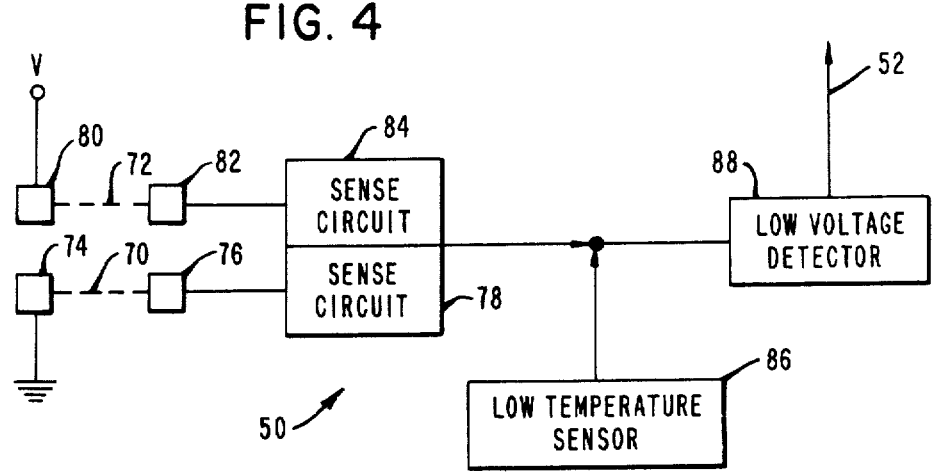
FIG. 4 is a schematic block diagram of a tamper detection circuit included in the circuitry shown in FIG. 3.

Referring now to FIG. 4, the tamper detection circuit 50 includes two wire meshes 70 and 72 disposed on the plates P1-P6 forming the housing 12 as discussed hereinabove. The wire mesh 70 is connected to a terminal 74 which is connected to ground, and to a terminal 76 which is connected to a sense circuit 78. The wire mesh 72 is connected to a terminal 80 which is connected to a supply voltage V, and to a terminal 82, which is connected to a sense circuit 84. The sense circuits 78 and 84, and a low temperature sensor 86 are commonly connected to a low voltage detector 88 which has an output connected to the lead 52 (FIG.3). Briefly, an attempt to penetrate the housing 12 of the security module 10 by drilling into or cracking the housing 12 will result in an interruption of one or both of the wire meshes 70, 72 or a short circuit therebetween. These conditions are detected by the sense circuits 78, 84 to produce a low voltage output which causes the low voltage detector 88 to provide a RESET output signal on the lead 52. Any attempt to cool the security module 10 below a predetermined temperature in an attempt to "freeze" the contents of the resettable shift register 54 will cause the low temperature sensor 86 to provide a low voltage signal which again causes the low voltage detector 88 to provide the RESET signal on the lead 52. The function of the RESET signal is to reset the resettable shift register 54 (FIG. 3).

Referring again to FIG. 3, it should be understood that the program memory 40 stores, in a RAM type memory, the firmware (control program) which controls and determines the functional operation of the security module 10.

Figure 5:
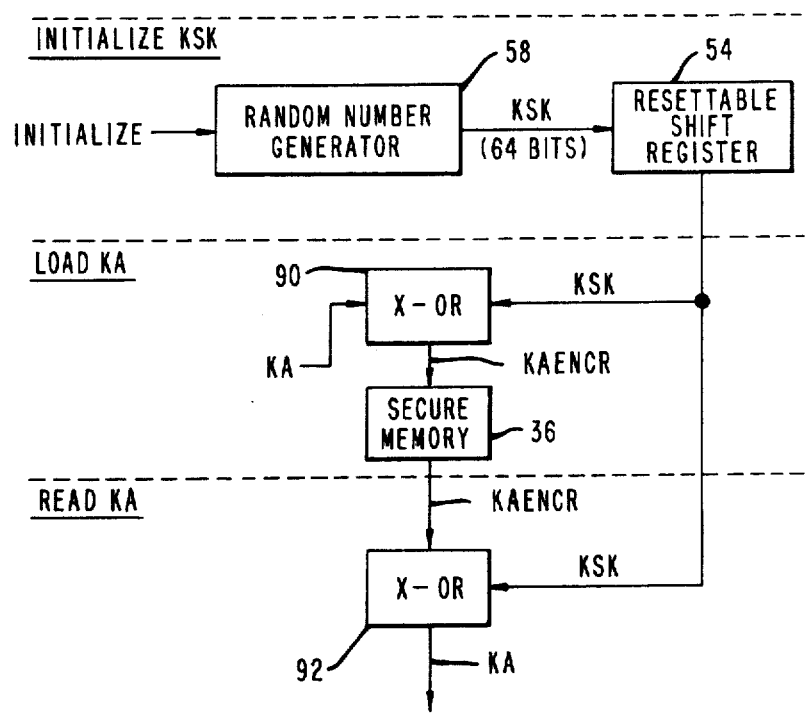
FIG. 5 is a functional block diagram illustrating how an authentication key is stored and read out.

After the security module 10 has been assembled, tested and closed, an initialization operation is performed under the control of an initialization routine stored in the ROM 34 (FIG. 3). Referring to FIGS. 3 and 5, the initialization operation results in the provision by the microprocessor 30 of a signal on the lead 60 to cause the random number generator 58 to generate a 64-bit random number which is entered into the resettable shift register 54 and is referred to hereinafter as key storage key KSK. Next, in the initialization operation, a 64-bit authentication key KA is applied to the security module 10 (FIG. 1) via the bus 44 (FIG. 3) and the input/output unit 42. The authentication key KA is then encrypted using KSK by applying KA and KSK to an EXCLUSIVE-OR gate 90 (FIG. 5) contained in the microprocessor 30. Alternatively, the EXCLUSIVE-OR function could be implemented in the microprocessor 30 by a software routine contained in the ROM 34. Furthermore, instead of an EXCLUSIVE-OR encryption operation, for example, a full DES (Data Encryption Standard) encryption involving sixteen cycles of the DES encryption operation, or a lesser number of such cycles, e.g. four cycles, could be employed. The encrypted authentication key KA is stored in the secure memory 36.

Having loaded the authentication key KA in encrypted form in the secure memory 36, the initialization operation continues by loading the initial firmware for the security module via the input/output unit 42 (FIG. 3) into the program memory 40. Also, there is loaded into the program memory 40 an additional load routine which is utilized when it is desired to load new firmware into the program memory.

It will be appreciated that the initialization operation described above is effected in a secure environment, whereby the security of the authentication key KA and the initial firmware can be guaranteed. Subsequently, the security module may be incorporated, for example, in electronic funds transfer POS data terminal equipment, in a field location. If it is desired to upgrade or alter the firmware, so as to enhance or alter the functionality of the security module 10, then it is expensive and time-consuming to ship the security module from the field location to a secure environment.

The present invention provides the capability of loading new firmware into the security module 10 in a trusted manner in the field location.

Figures 6, 7:
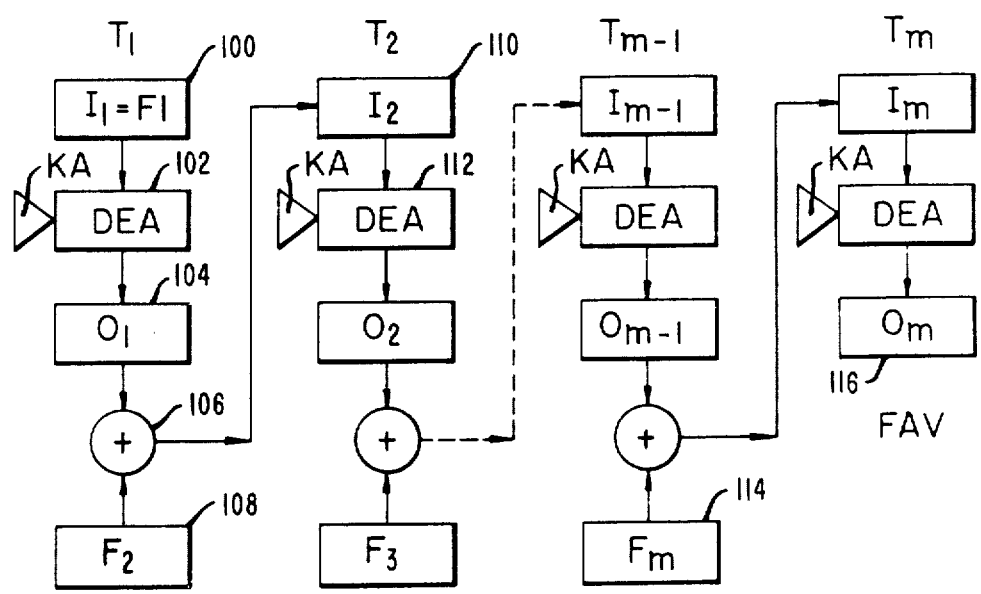
FIG. 6 is a diagram illustrating the format of firmware to be loaded into the security module.
FIG. 7 is a diagram illustrating an algorithm used for providing a firmware authentication value.

It will now be assumed that it is desired to load new firmware F into the security module 10. Referring to FIG. 6, there is illustrated the new firmware to be loaded into the security module 10, which firmware consists of n bytes. The new firmware F is divided into m blocks, each of 64 bits, using zeros to pad the final block if necessary. Thus, the new firmware can be arranged as:

$$F = F_1 F_2 \ldots F_m$$

where $F_1, F_2, \ldots, F_m$ each consist of 64 bits. A firmware authentication value FAV, consisting of 4 bytes, is then calculated in accordance with the algorithm shown in FIG. 7.

Referring to FIG. 7, the algorithm is effected in m time periods $T_1, T_2, \ldots, T_m$. During time period $T_1$, the 64-bit block $F_1$ is applied as an input $I_1$ (block 100) to the DEA (Data Encryption Algorithm) (block 102), using KA as the DES key. It will be appreciated that the DEA is a standard algorithm fully described in standard publications such as FIPS (Federal Information Processing Standards) Publication No. 46. The output $O_1$ (block 104) of the DEA calculation is applied to an EXCLUSIVE-OR gating device 106, together with the next 64-bit firmware block $F_2$ (block 108). During time period $T_2$, the output of the EXCLUSIVE-OR gating device 106 is applied as the input $I_2$ (block 110) to a second DEA calculation (block 112), again using the authentication key KA. The procedure continues in similar manner until the final 64-bit firmware block $F_m$ has been utilized (block 114) and a final output $O_m$ (block 116) has been obtained. The leftmost 32 bits of the final output $O_m$ are then taken as a firmware authentication value FAV. The FAV is appended to the firmware F to form a further 4 bytes $n+1, \ldots, n+4$ thereof, as shown in FIG. 6.

It should be understood that the algorithm described above with reference to FIG. 7 is exemplary only, and that alternative algorithms could be used to provide a firmware authentication value FAV.

It should further be understood that the firmware authentication value FAV can be generated using a suitable programmed processor, or by dedicated hardware.

The firmware, together with the authentication value FAV, is stored on a floppy disk, or other storage device.

Figure 8:
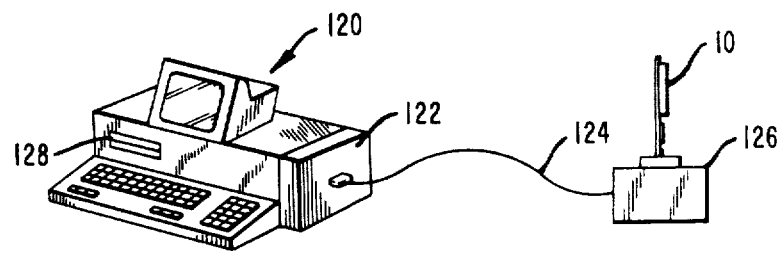
FIG. 8 illustrates apparatus which is used for loading firmware into the security module.

Referring to FIG. 8, there is shown schematically apparatus for loading the new firmware into the security module 10. The apparatus includes a personal computer 120 which is provided with a connector board 122 connected by a cable 124 to a connector box 126. The security module 10 is plugged into the connector box 126. The floppy disc (not shown) containing the new firmware F and the associated firmware authentication value FAV is then inserted into a floppy disc receptacle 128 in the personal computer 120. Under program control, the personal computer 120 causes the new firmware and the associated FAV to be applied to the security module via the connector board 122, the cable 124 and the connector box 126.

Figure 9:
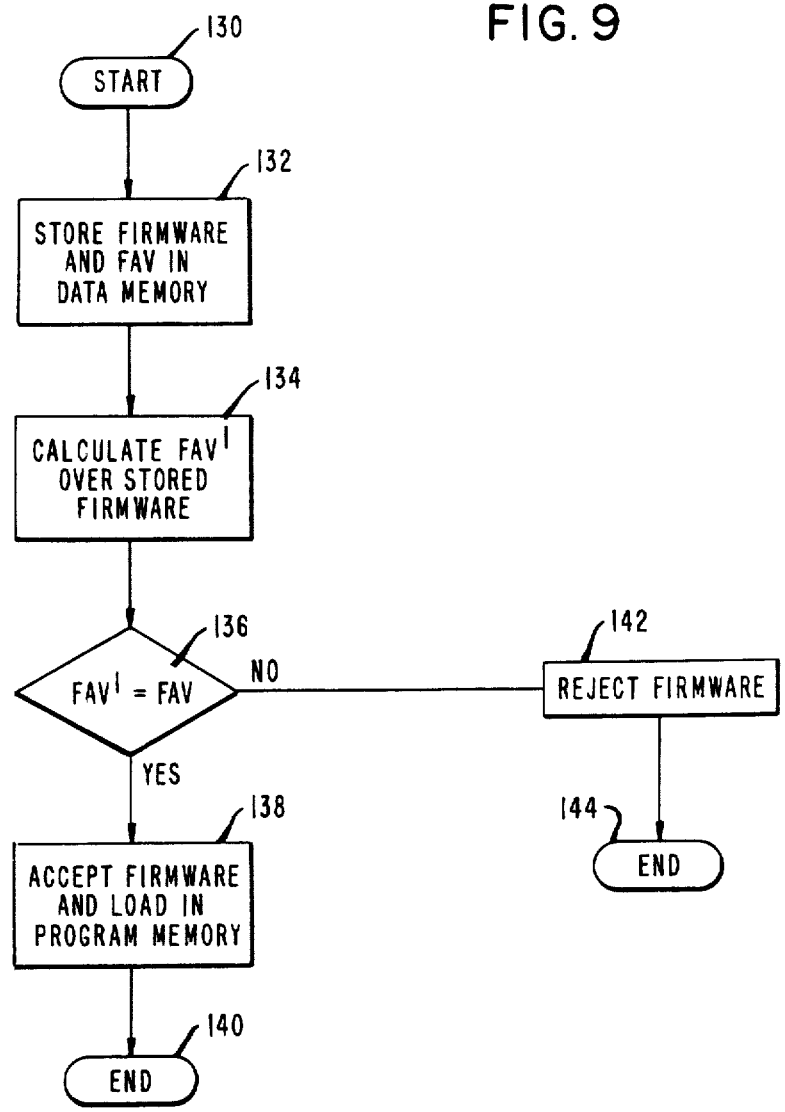
FIG. 9 is a flowchart illustrating the routine used for loading firmware into the security module.

Referring to FIG. 9, there is shown a flowchart for loading the new firmware. The flowchart starts at block 130. The new firmware, together with the associated FAV, is applied to the security module 10 (FIG. 1) as discussed with reference to FIG. 8, and entered, via the input/output unit 42 (FIG. 3) into the data memory 38 (FIG. 3) (block 132). Next, referring briefly to FIG. 5, the additional load routine stored in the program memory 40 (FIG. 3) causes the key storage key KSK to be applied from the resettable shift register 54, together with the encrypted authentication key KAENCR to be applied to an EXCLUSIVE-OR gating device 92 included in the microprocessor 30. The output of the EXCLUSIVE-OR gating device 92 is the cleartext value of the authentication key KA. Of course, if the EXCLUSIVE-OR gate device 90 is replaced by a more complex encryption device or encryption routine, then the EXCLUSIVE-OR gating device 92 will be replaced by a corresponding decryption device or decryption routine.

Returning again to FIG. 9, the additional load routine next causes the new firmware to be applied to the microprocessor 30 (FIG. 3) where the algorithm shown in FIG. 7 is performed using the key KA to calculate a firmware authentication value FAV' (block 134). The algorithm may be stored in the ROM 34 (FIG. 3) or in the program memory 40. In block 136, a comparison is made as to whether FAV'=FAV. If the comparison is positive, the firmware is transferred from the data memory 38 to the program memory 40 (block 138), an accept status signal is issued, and the additional load routine ends at block 140. If the comparison is negative then the firmware is rejected (block 142) and the comparison operation provides a reject signal which causes the firmware stored in the data memory 38 to be erased and the additional load routine ends at block 144.

It is noted that in the event of a positive comparison between FAV' and FAV, the new firmware is transferred from the data memory 38 to the program memory 40. It should be understood that such transfer need not be a physical transfer. Thus, the RAM memory which forms the secure memory 36, the data memory 38 and the program memory 40, stores a firmware allocation block (FAB) which serves as a pointer to indicate the location of the firmware. An appropriate alteration of such firmware allocation block effects the transfer of the new firmware from the data memory 38 to the program memory 40 without a physical movement of the firmware between RAM storage locations.

Thus, the security module 10 has been loaded with new firmware in a trusted manner. It will be appreciated that if it is attempted to load into the security module 10 any firmware which has been modified in an unauthorized manner, then a negative comparison between FAV' and FAV will result, and hence the firmware will be rejected. Also, it will be appreciated that the functionality of the security module 10 can be changed by loading the new firmware at a non-secure field location, without the shipment of the module to a special secure facility.

It will be noted that any attempt to tamper with or break into the security module will result in the generation of the RESET signal on the lead 52 (FIG. 3). Such RESET signal is effective to reset the resettable shift register 54 and hence erase the key storage key KSK. With KSK erased, the authentication key KA, stored in the secure memory 36 as KAENCR becomes unavailable since it cannot be decrypted, and hence the security module 10 can no longer be loaded with new firmware. Thus, possible compromise of the security of a system utilizing the security module 10 by unauthorized discovery of the authentication key KA, is prevented.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the claims.

What is claimed is:

1. A method of controlling the operation of a security module which includes processing means, a program memory adapted to store controlling firmware for controlling the operation of said security module, input/output means, and a tamper-resistant housing adapted to cause the generation of a tamper-indicating signal to occur in response to an attempt to tamper with said housing, including the steps of:

entering an authentication key into said security module via said input/output means after the tamper-resistant housing has been sealed;

encrypting the entered authentication key;

storing the encrypted authentication key securely in a first storage means in said security module, whereby the stored encrypted authentication key becomes unavailable in response to the generation of said tamperindicating signal;

computing externally of said security module a first firmware authentication value utilizing the controlling firmware to be loaded into the security module and said authentication key;

adding the first firmware authentication value to the firmware to be loaded;

entering, via said input/output means, said controlling firmware and said first firmware authentication value into a location in a second storage means in said security module;

providing a random access memory means which includes said program memory and said first and second storage means, and storing a firmware allocation block in said random access memory means to serve as a pointer to indicate the location of said controlling firmware in said second storage means;

computing in said processing means a second firmware authentication value utilizing the controlling firmware stored in said second storage means and said authentication key stored in said first storage means;

comparing said first and second firmware authentication values;

transferring the controlling firmware stored in said second storage means into said program memory if there is a valid comparison; and erasing the controlling firmware stored in said second storage means if there is an invalid comparison.

2. A method according to claim 1, wherein said step of transferring the controlling firmware stored in said second storage means into said program memory includes the step of altering said firmware allocation block in accordance with the location of said controlling firmware stored in said second storage means.

* * * * *

UNITED STATES PATENT AND TRADEMARK OFFICE
CERTIFICATE OF CORRECTION

PATENT NO. : 4,849,927

DATED : July 18, 1989

INVENTOR(S) : Gerardus J. F. Vos

It is certified that error appears in the above-identified patent and that said Letters Patent is hereby corrected as shown below:

Column 8, line 4, delete "input-" and substitute --input/--.

Column 8, line 5, delete "/output" and substitute --output--.

Column 8, line 17, delete "tamperindicating" and substitute --tamper-indicating--.

Signed and Sealed this

Fifteenth Day of May, 1990

Attest:

HARRY F. MANBECK, JR.

*Attesting Officer*     *Commissioner of Patents and Trademarks*